US007155389B2

(12) United States Patent
Belenger et al.

(10) Patent No.: US 7,155,389 B2

(45) Date of Patent: *Dec. 26, 2006

(54) DISCRIMINATING SPEECH TO TOUCH TRANSLATOR ASSEMBLY AND METHOD

(75) Inventors: Robert V. Belenger, Raynham, MA (US); Gennaro R. Lopriore, Somerset, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 841 days.

This patent is subject to a terminal disclaimer.

(21) Appl. No.: 10/292,953

(22) Filed: Nov. 12, 2002

(65) Prior Publication Data

US 2004/0093214 A1 May 13, 2004

(51) Int. Cl.
*G10L 15/00* (2006.01)

(52) U.S. Cl. ...................................................... 704/251

(58) Field of Classification Search ................. 704/251
See application file for complete search history.

(56) References Cited

U.S. PATENT DOCUMENTS 5,636,038 A * 6/1997 Lynt et al. .................. 358/471
6,326,901 B1 * 12/2001 Gonzales .................... 340/7.2

* cited by examiner

*Primary Examiner*—Daniel Abebe
(74) *Attorney, Agent, or Firm*—Jean-Paul A. Nasser; James M. Kasischke; Michael P. Stanley

(57) ABSTRACT

A speech to touch translator assembly and method for converting spoken words directed to an operator into tactile sensations caused by combinations of pressure point exertions on the body of the operator, each combination of pressure points exerted signifying a phoneme of one of the spoken words, and sound characteristics superimposed on the spoken words, permitting comprehension of spoken words, and the speaker thereof, by persons that are deaf and blind.

14 Claims, 3 Drawing Sheets

| CONSONANT SOUNDS | | | | PRESSURE FINGER ACTUATION CODES | | | | | |
|---|---|---|---|---|---|---|---|---|---|
| | | | | PRESSURE FINGER # | | | | | |
| | | | | 1 | 2 | 3 | 4 | 5 | 6 |
| 1 | p | as in | sip | 0 | 0 | 0 | 0 | 0 | 1 |
| 2 | p | as in | pen | 0 | 0 | 0 | 0 | 0 | 1 |
| 3 | b | as in | bit | 0 | 0 | 0 | 0 | 1 | 1 |
| 4 | m | as in | map | 0 | 0 | 0 | 1 | 0 | 0 |
| 5 | w | as in | wit | 0 | 0 | 0 | 1 | 0 | 1 |
| 6 | ou | as in | out | 0 | 0 | 0 | 1 | 1 | 0 |
| 7 | f | as in | fat | 0 | 0 | 0 | 1 | 1 | 1 |
| 8 | v | as in | vat | 0 | 0 | 1 | 0 | 0 | 0 |
| 9 | t | as in | thin | 0 | 0 | 1 | 0 | 0 | 1 |
| 10 | th | as in | this | 0 | 0 | 1 | 0 | 1 | 0 |
| 11 | st | as in | step | 0 | 0 | 1 | 0 | 1 | 1 |
| 12 | t | as in | tip | 0 | 0 | 1 | 1 | 0 | 0 |
| 13 | d | as in | dip | 0 | 0 | 1 | 1 | 0 | 1 |
| 14 | n | as in | nip | 0 | 0 | 1 | 1 | 1 | 0 |
| 15 | l | as in | lip | 0 | 0 | 1 | 1 | 1 | 1 |
| 16 | tt | as in | utter | 0 | 1 | 0 | 0 | 0 | 0 |
| 17 | s | as in | sip | 0 | 1 | 0 | 0 | 0 | 0 |
| 18 | z | as in | zip | 0 | 1 | 0 | 0 | 1 | 0 |
| 19 | r | as in | red | 0 | 1 | 0 | 0 | 1 | 1 |
| 20 | ss | as in | mission | 0 | 1 | 0 | 1 | 0 | 0 |
| 21 | s | as in | vision | 0 | 1 | 0 | 1 | 0 | 1 |
| 22 | ck | as in | sick | 0 | 1 | 0 | 1 | 1 | 0 |
| 23 | k | as in | kiss | 0 | 1 | 0 | 1 | 1 | 1 |
| 24 | g | as in | give | 0 | 1 | 1 | 0 | 0 | 0 |
| 25 | ng | as in | king | 0 | 1 | 1 | 0 | 0 | 1 |
| 26 | y | as in | yet | 0 | 1 | 1 | 0 | 1 | 0 |
| 27 | i | as in | bite | 0 | 1 | 1 | 0 | 1 | 1 |
| 28 | h | as in | hit | 0 | 1 | 1 | 1 | 0 | 0 |

10 12

FIG. 2A

| VOWEL SOUNDS | | | | PRESSURE FINGER ACUATION CODES — PRESSURE FINGER # | | | | | |
|---|---|---|---|---|---|---|---|---|---|
| | | | | 1 | 2 | 3 | 4 | 5 | 6 |
| 29 | ee | as in | b e e t | 0 | ‘1 | 1 | 1 | 0 | 1 |
| 30 | i | as in | b i t | 0 | ‘1 | 1 | 1 | 1 | 0 |
| 31 | i | as in | b i d | 0 | ‘1 | 1 | 1 | 1 | 1 |
| 32 | ai | as in | a i d | 1 | 0 | 0 | 0 | 0 | 0 |
| 33 | a | as in | a t | 1 | 0 | 0 | 0 | 0 | 1 |
| 34 | ur | as in | h u r t | 1 | 0 | 0 | 0 | 1 | 0 |
| 35 | e | as in | b e t | 1 | 0 | 0 | 0 | 1 | 1 |
| 36 | a | as in | a b o u t | 1 | 0 | 0 | 1 | 0 | 0 |
| 37 | u | as in | p u t t | 1 | 0 | 0 | 1 | 0 | 1 |
| 38 | a | as in | f a t h e r | 1 | 0 | 0 | 1 | 1 | 0 |
| 39 | oo | as in | f o o d | 1 | 0 | 0 | 1 | 1 | 1 |
| 40 | oo | as in | f o o t | 1 | 0 | 1 | 0 | 0 | 0 |
| 41 | oe | as in | t o e | 1 | 0 | 1 | 0 | 0 | 1 |
| 42 | aw | as in | l a w | 1 | 0 | 1 | 0 | 1 | 1 |

10 12

FIG. 2B

DISCRIMINATING SPEECH TO TOUCH TRANSLATOR ASSEMBLY AND METHOD

STATEMENT OF GOVERNMENT INTEREST

The invention described herein may be manufactured and used by and for the Government of the United States of America for Governmental purposes without the payment of any royalties thereon or therefor.

CROSS-REFERENCE TO RELATED PATENT APPLICATIONS

This patent application is co-pending with four related patent applications entitled SPEECH TO VISUAL AID TRANSLATOR ASSEMBLY AND METHOD Ser. No. 10/292,955, by the same inventor as this application.

BACKGROUND OF THE INVENTION (1) Field of the Invention

The invention relates to an assembly and method for assisting a person who is both hearing and sight impaired to understand a spoken word, and is directed more particularly to an assembly including a set of fingers in contact with the person's body and activatable in a coded manner, in response to speech sounds, to exert combinations of pressure points on the person's body.

(2) Description of the Prior Art

Various devices and methods are known for enabling hearing-handicapped individuals to receive speech. Sound amplifying devices, such as hearing aids are capable of affording a satisfactory degree of hearing to some with a hearing impairment. For the deaf, or those with severe hearing impairments, no means is available that enables them to receive conveniently and accurately speech with the speaker absent from view. With the speaker in view, a deaf person can speech read, i.e., lip read, what is being said, but often without a high degree of accuracy. The speaker's lips must remain in full view to avoid loss of meaning. Improved accuracy can be provided by having the speaker "cue" his speech using hand forms and hand positions to convey the phonetic sounds in the message. The hand forms and hand positions convey approximately 40% of the message and the lips convey the remaining 60%. However, the speaker's face must still be in view.

The speaker may also convert the message into a form of sign language understood by the deaf person. This can present the message with the intended meaning, but not with the choice of words or expression of the speaker. The message can also be presented by fingerspelling, i.e., "signing" the message letter-by-letter, or the message can simply be written out and presented.

Such methods of presenting speech require the visual attention of the hearing-handicapped person.

It is apparent that if the deaf person is also blind, the aforementioned devices and methods are not helpful. People with both hearing and sight losses have a much more difficult problem to overcome in trying to acquire information and communicate with the world. Before they can respond to any communication directed at them, they must be able to understand what is being said in real time, or close to real time, and preferably without the use of elaborate and cumbersome computer aided methods more suitable for a fixed location than a relatively more mobile life style.

There is thus a need for a device which can convert, or translate, spoken words to signals which can be felt, that is, received tactually, by a deaf and blind person to whom the spoken words are directed.

In U.S. patent application Ser. No. 10/224,230, filed Aug. 19, 2002, in the names of Robert Belenger and Gennaro Lopriore, there is described a speech to touch translator assembly and method which is operative to convert, or translate, spoken words to signals which can be felt, that is, received tactually, by a deaf and blind person to whom the spoken words are directed. There remains, however, a need for the receiver of the spoken words to be able to discriminate between different speakers and thus a need for a translator of the type described in the aforementioned application but further providing an indication as to the originators of the spoken words.

SUMMARY OF THE INVENTION

Accordingly, an object of the invention is to provide a speech to touch translator assembly and method for converting a spoken message into tactile sensations upon the body of the receiving person, such that the receiving person can identify certain tactile sensations with corresponding words, and which provides discriminating distinctions among various speakers.

With the above and other objects in view, a feature of the invention is the provision of a speech to touch translator assembly comprising an acoustic sensor for detecting word sounds and transmitting the word sounds, a sound amplifier for receiving the word sounds from the acoustic sensor and raising the sound signal level thereof, and transmitting the raised sound signal, a speech sound analyzer for receiving the raised sound signal from the sound amplifier and determining (a) amplitude thereof, (b) frequency content thereof, (c) relative loudness/emphasis thereof, (d) suprasegmental information thereof, including (i) rhythm, (ii) rising of voice pitch, and (iii) falling of voice pitch, (e) intonational contour thereof, including word pitch accompanying production of a sentence, and (f) time sequence of (a)–(e), converting (a)–(e) to data in digital format, and transmitting the data in the digital format. A phoneme sound correlator receives the data in digital format and compares the data with a phonetical alphabet. A phoneme library is in communication with the phoneme sound correlator and contains all phoneme sounds of the selected phonetic alphabet. The translator assembly further comprises a match detector in communication with the phoneme sound correlator and the phoneme library and operative to sense a predetermined level of correlation between an incoming phoneme and a phoneme resident in the phoneme library, and a phoneme buffer for (a) receiving phonetic phonemes from the phoneme library in time sequence, and for (b) receiving from the speech sounds analyzer data indicative of the relative loudness variations, suprasegmental information, intonational information, and time sequences thereof, and for (c) arranging the phonetic phonemes from the phoneme library and attaching thereto appropriate information as to relative loudness, suprasegmental and intonational information, for use in a format to actuate combinations of pressure fingers, each combination being correlated with a phoneme. An array of actuators is provided, each for initiating movement of one of the pressure fingers, the actuators being operable in combination, each combination being representative of a particular phoneme, the pressure fingers being adapted to engage the body of an operator, such that the feel of a combination of pressure fingers is interpretable by the operator as a word sound.

In accordance with a further feature of the invention, there is provided a method for translating speech to tactile sensations on the body of an operator to whom the speech is directed. The method comprises the steps of sensing word sounds acoustically and transmitting the word sounds amplifying the transmitted word sounds and transmitting the amplified word sounds, analyzing the transmitted amplified word sounds and determining (a) amplitude thereof, (b) frequency content thereof, (c) relative loudness/emphasis thereof, (d) suprasegmental information thereof, including (i) rhythm, (ii) rising of voice pitch, and (iii) falling of voice pitch, (e) intonational contours thereof, including vocal pitch accompanying production of a sentence, and (f) time sequences of (a)–(e), converting (a)–(e) to data in digital format, transmitting the data in digital format, comparing the transmitted data in digital format with a phoneticized alphabet in a phoneme library, determining a selected level of correlation between an incoming phoneme and a phoneme resident in the phoneme library, arraying the phonemes from the phoneme library in time sequence and attaching thereto the (a)–(e) determined from the analyzing of the amplified word sounds, and placing the arranged phonemes in formats to actuate selected combinations of pressure finger actuators, each of the combinations being correlated with one of the phonemes with (a)–(e) attached thereto, wherein the actuators cause the pressure fingers to engage the body of the operator in the selected combinations.

The above and other features of the invention, including various novel details of combinations of components and method steps, will now be more particularly described with reference to the accompanying drawings and pointed out in the claims. It will be understood that the particular assembly and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, and wherein:

FIG. 2A is a chart showing an illustrative arrangement of pressure finger actuators and the spoken consonant sounds, or phonemes, represented by various combinations of pressure fingers; and FIG. 2B is a chart similar to FIG. 2, but showing an arrangement of pressure finger actuators and the spoken vowel sounds represented by combinations of pressure fingers.

DESCRIPTION OF THE PREFERRED EMBODIMENTS

Figure 1:
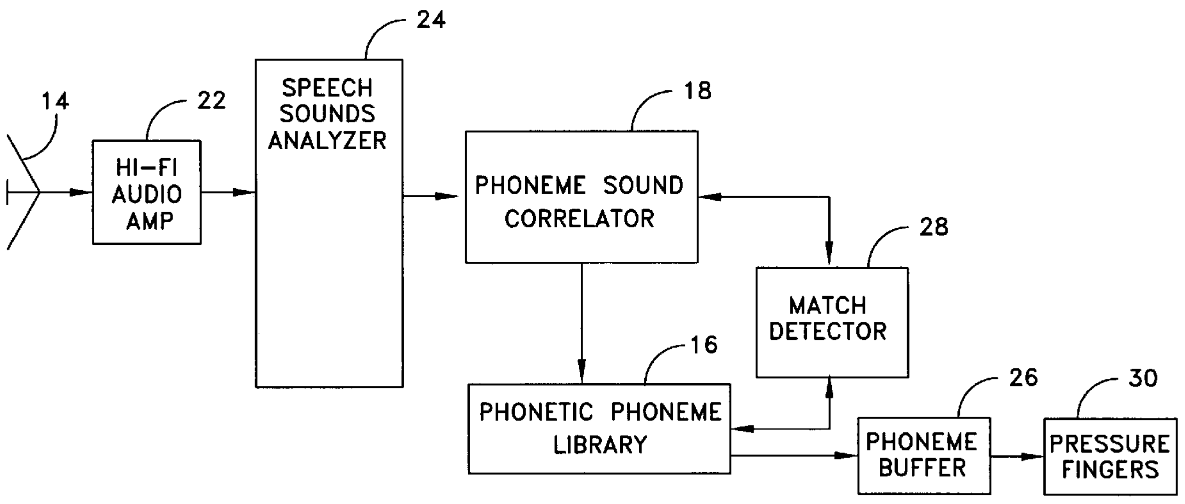
FIG. 1 is a block diagram illustrative of one form of the assembly and method illustrative of an embodiment of the invention.

Only 40+ speech sounds represented by a phonetic alphabet, such as the Initial Teaching Alphabet (English), shown in FIGS. 2A and 2B, or the more extensive International Phonetics Alphabet (not shown), usable for many languages, need to be considered in dynamic translation of speech sounds, or phonemes 10 to touch code 12. In practice, the user "listens" to a speaker or some other audio source by feeling the combinations of the coded, phoneticized words as a set of changing pressure imprints on pre-selected spots on the listener's body, for example on the fingers and palm of a hand. With training, the meaning of the touch coded phoneticized words are apparent to someone who understands the particular language being spoken.

The phonemes 10 comprising the words in a sentence are sensed via electro-acoustic means 14 and amplified to a level sufficient to permit their analysis and breakdown of the word sounds into amplitude and frequency characteristics in a time sequence. In order to provide discrimination as to identification of speakers, other information relating to a word sound is incorporated into the coding of the phonemes. This additional information includes loudness, suprasegmentals, including rhythm, and the rising and falling of a voice pitch, and the sentence's contour, including the changes of vocal pitch that accompanies production of a sentence and which can have a strong effect on the meaning of a sentence. This is done, for example, by superimposing combinations of pressure finger movement on the primary stroke of the finger's action, such as varying the amplitude of the finger stroke for loudness/emphasis, vibrating the finger for the sentence's or word's pitch, or some other combination of movements for suprasegmentals. The sound characteristics are put into a digital format and correlated with the contents of a phonetic phoneme library 16 that contains the phoneme set for the particular language being used. A correlator 18 compares the incoming digitized phoneme with the contents of the library 16 to determine which of the phonemes in the library, if any, match the incoming word sound of interest. When a match is detected, the phoneme of interest is copied from the library and sent to a phoneme to sound code converter, where the digitized form of the phoneme is coded into a six bit code 20 that actuates the appropriate pressure fingers in contact with the user's body. The contact can be made by the user holding a hand grip shaped actuator device in his hand, such that the six pressure fingers are in contact with one of each fingers and the palm. If the user is unable to hold the grip because of some physical disability, the pressure fingers can be attached to some other location on the body in a manner which permits the user to tell what pressure fingers are providing the pressure and thus what phoneme is represented by the code.

The speech sounds 10 are coded into combinations of pressure fingers actuations—one combination for each phoneme—in a series of combinations representing the phoneticized word(s) being spoken. A six digit binary code, for example, is sufficient to permit the coding of all English phonemes, with spare code capacity for about 20 more. An additional digit can be added if the language being phonetized contains more phonemes than can be accommodated with six digits.

The practice or training required to use the device is similar to learning a language of some forty odd words coded for in the actuation combinations of the pressure fingers. By using the device in a simulation mode, a user is able to "listen" to spoken words including his own, a recording, or from some other source, and feel the phoneticized words as combinations of pressure points on the different fingers and palm, for example, if a hand grip is used. As stated above, if a hand grip is not suitable, due to a user's physical handicap, the pressure fingers can be appropriately attached to parts of the body having a sense of touch.

Referring to FIG. 1, the directional acoustic sensor 14 detects the word sounds produced by a speaker or other source. The directional acoustic sensor preferably is a sensitive, high fidelity microphone suitable for use with the frequency range of interest.

A high fidelity sound amplifier 22 raises a sound signal level to one that is usable by a speech sound analyzer 24. The high fidelity acoustic amplifier 22 is suitable for use with the frequency range of interest and with sufficient capacity to provide the driving power required by the speech sound analyzer 24.

The analyzer 24 determines the frequencies, relative loudness variations, suprasegmentals, and intonation contour information of the sounds, and their time sequence, for each word sound sensed. The speech sound analyzer 24 is further capable of determining the suprasegmental and intonational characteristics of the word sound, as well as contour characteristics of the sound. At least some of such information, with its' time sequence, is converted to a digital format for later use by the phoneme sound correlator 18 and a phoneme buffer 26. The determinations of the analyzer 24 are presented in a digital format to a phoneme sound correlator 18.

The correlator 18 uses the digitized data contained in the phoneme of interest to query the phonetic phoneme library 16, where the appropriate phoneticized alphabet is stored in a digital format. Successive library phoneme characteristics are compared to the incoming phoneme of interest in the correlator 18. A predetermined correlation factor is used as a basis for determining "matched" or "not matched" conditions. A "not matched" condition results in no input to the phoneme buffer 26 and no subsequent activation of the pressure fingers 30. Similarly, word spacing intervals do not activate the pressure fingers 30, telling the user that a word is completed and the next phoneme starts a new word. The correlator 18 queries the phonetic alphabet phoneme library 16 to find a digital match for the word sound characteristics in the correlator.

The library 16 contains all the phoneme sounds of a phoneticized alphabet characterized by their relative amplitude and frequency content in a time sequence as well as loudness, suprasegmental and intonation superimpositions. When a match detector 28 signals a match, the appropriate digitized phonetic phoneme is copied from the phoneme buffer 26, where it is stored and coded properly to activate the appropriate pressure fingers to be interpreted by the user as a particular phoneme.

When a match is detected by the match detector 28, the phoneme of interest is copied from the library 16 and stored in the phoneme buffer 26, where it is coded for actuation of the appropriate pressure fingers 30. The phoneme buffer is a digital buffer capable of assembling and arranging the phonemes from the library in their proper time sequences and attaches any relative loudness, suprasegmental and intonation contour information in digitized form coded in a suitable format to actuate the proper pressure finger combinations for the user to interpret as a particular phoneme with the particular sound characteristics superimposed on it.

The match detector 28 is a correlation detection device capable of sensing a predetermined level of correlation between an incoming phoneme and one resident in the phoneme library 16. At this time, it signals the library 16 to enter a copy of the appropriate phoneme into the phoneme buffer 26.

The pressure fingers 30 are miniature electro-mechanical devices mounted in a hand grip (not shown) or arranged in some other suitable manner that permits the user to "read" and understand the code 20 (FIG. 2) transmitted by the pressure finger combinations 12 actuated by the particular word sound. The number of actuators and pressure fingers required suits the phoneme set of the particular language being used, with six being suitable for the English language. Seven actuators are more than sufficient for most languages. See FIGS. 2A and 2B for an example of a binary coding scheme.

There is thus provided a speech to touch translator assembly and method which enables a person with both hearing and sight handicaps to understand the spoken word and, further, to identify the speaker.

It will be understood that many additional changes in the details, method steps and arrangement of components, which have been herein described and illustrated in order to explain the nature of the invention, may be made by those skilled in the art within the principles and scope of the invention as expressed in the appended claims.

What is claimed is:

1. A speech to touch translator comprising:

an acoustic sensor for detecting word sounds and transmitting the word sounds;

a sound amplifier for receiving the word sounds from said acoustic sensor and raising the sound signal level thereof, and transmitting the raised sound signal;

a speech sound analyzer for receiving the raised sound signal from said sound amplifier and determining,
(a) amplitude thereof,
(b) frequency content thereof,
(c) relative loudness/emphasis thereof,
(d) suprasegmental information thereof, including (i) rhythm, (ii) rising of voice pitch and (iii) falling of voice pitch,
(e) intonational contours thereof, including vocal pitch accompanying production of a sentence, and
(f) time sequence of (a)–(e);

converting (a)–(e) to data in digital format, and transmitting the data in the digital format;

a phoneme sound correlator for receiving the data in digital format and comparing the data with a phoneticized alphabet to find a digital match for the word sound characteristics;

a phoneme library in communication with said phoneme sound correlator and containing all phoneme sounds of the selected phoneticized alphabet, characterized by amplitude, frequency content, loudness, suprasegmental and intonation superimposed on the phoneme sounds;

a match detector in communication with said phoneme sound correlator and said phoneme library and operative to sense a predetermined level of correlation between an incoming phoneme and a phoneme resident in said phoneme library;

a phoneme buffer for (i) receiving phonetic phonemes from said phoneme library in time sequence, and for (ii) receiving from said speech sounds analyzer data indicative of the relative loudness, amplitude, frequency content, emphasis, suprasegmental information, intonational information, and time sequences thereof, and for (iii) coding the phonetic phonemes from said phoneme library and attaching thereto appropriate information as to relative loudness, supra-segmental and intonational characteristics superimposed upon the amplitude and frequency characteristics, for use in a format to actuate combinations of pressure fingers, each combination being correlated with a phoneme; and an array of actuators, each for initiating movement of one of the pressure fingers, the actuators being operable in combination, each combination being representative of a particular phoneme, the pressure fingers being adapted to engage the body of an operator, such that the feel of a combination of pressure fingers is interpretable by the operator as a word sound with superimposed information presented tactually to enable the operator to identify word source.

2. The assembly in accordance with claim 1 wherein said acoustic sensor comprises a directional acoustic sensor.

3. The assembly in accordance with claim 2 wherein said directional acoustic sensor comprises a high fidelity microphone.

4. The assembly in accordance with claim 2 wherein said speech sound amplifier is a high fidelity sound amplifier adapted to raise the sound signal level to a level usable by said speech sound analyzer.

5. The assembly in accordance with claim 4 wherein said speech sound amplifier is powered sufficiently to drive itself and said speech sound analyzer.

6. The assembly in accordance with claim 4 wherein said speech sound analyzer determines (a)–(e).

7. The assembly in accordance with claim 6 wherein said phoneme sound correlator is adapted to compare any of (a)–(e) with the same characteristics of phonemes stored in said phoneme library.

8. The assembly in accordance with claim 7 wherein said phoneme library contains all of the phoneme sounds of the selected phoneticized alphabet and their characterizations with respect to (a)–(e).

9. The assembly in accordance with claim 8 wherein said match detector, upon sensing the predetermined level of correlation, is operative to signal said phoneme library to enter a copy of the phoneme into said phoneme buffer.

10. The assembly in accordance with claim 9 wherein said phoneme buffer is a digital buffer and receives phonemes from said phoneme library in time sequence and in digitized form coded to actuate said array of actuators to actuate the pressure fingers in combination for the operator to interpret as the word sound and the word source.

11. A method for translating speech to tactile sensations on the body of an operator to whom the speech is directed, the method comprising the steps of;

sensing word sounds acoustically and transmitting the word sounds;

amplifying the transmitted word sounds and transmitting the amplified word sounds;

analyzing the transmitted amplified word sounds and determining all of, (a) amplitude thereof, (b) frequency content thereof, (c) relative loudness/emphasis thereof, (d) suprasegmental information thereof, including (i) rhythm, (ii) rising of voice pitch and (iii) falling of voice pitch, (e) intonational contours thereof, including vocal pitch accompanying production of a sentence, and (f) time sequence of (a)–(e);

converting (a)–(e) to data in digital format and transmitting the data in digital format;

comparing the transmitted data in digital format with a phoneticized alphabet in a phoneme library;

determining a selected level of correlation between an incoming phoneme and a phoneme resident in the phoneme library;

arranging the phonemes from the phoneme library in time sequence and attaching thereto the (a)–(e) determined from the analyzing of the amplified word sounds; and placing the arranged phonemes in formats to actuate selected combinations of pressure finger actuators, each of the combinations being correlated with one of the phonemes with (a)–(e) superimposed thereon;

wherein the actuation of the pressure fingers causes the fingers to engage the body of the operator in the selected combinations such that the operator is enabled to identify words and word sources.

12. The method in accordance with claim 11 wherein the sensing and transmission of word sounds is accomplished by a directional high fidelity acoustic sensor.

13. The method in accordance with claim 12 wherein the amplifying of the word sounds transmitted by the acoustic sensor is accomplished by a high fidelity sound amplifier adapted to raise the sound signal level to a level usable in the analyzing of the word sounds.

14. The method in accordance with claim 13 wherein the analyzing of the word sounds includes a determination of (a)–(f).

* * * * *